United States Patent
Mickael (10) Patent No.: US 10,302,811 B2
(45) Date of Patent: May 28, 2019

(54) DATA REDUCTION OF IMAGES MEASURED IN A BOREHOLE

(75) Inventor: Medhat W. Mickael, Sugar Land, TX (US)

(73) Assignee: WEATHERFORD TECHNOLOGY HOLDINGS, LLC, Houston, TX (US)

(*) Notice: Subject to any disclaimer, the term of this patent is extended or adjusted under 35 U.S.C. 154(b) by 1946 days.

(21) Appl. No.: 12/195,810

(22) Filed: Aug. 21, 2008

(65) Prior Publication Data

US 2010/0049443 A1 Feb. 25, 2010

(51) Int. Cl.
*G01V 11/00* (2006.01)

(52) U.S. Cl.
CPC .................. *G01V 11/002* (2013.01)

(58) Field of Classification Search
CPC ....................................................... G01V 11/002
USPC .................... 702/6, 7, 8, 9, 10, 11, 12, 13
See application file for complete search history.

(56) References Cited

U.S. PATENT DOCUMENTS

| | | | |
|---|---|---|---|
| 5,162,994 A * | 11/1992 | Torres | 702/10 |
| 5,519,668 A | 5/1996 | Montaron | |
| 5,753,813 A * | 5/1998 | Hagiwara | 73/152.54 |
| 5,774,420 A | 6/1998 | Heysse | |
| 5,899,958 A | 5/1999 | Dowell et al. | |
| 6,266,618 B1 * | 7/2001 | Ye et al. | 702/10 |
| 6,405,136 B1 * | 6/2002 | Li et al. | 702/10 |
| 6,566,649 B1 | 5/2003 | Mickael | |
| 6,932,167 B2 | 8/2005 | Prodt | |
| 7,003,168 B1 | 2/2006 | Chao | |
| 7,027,926 B2 * | 4/2006 | Haugland | 702/9 |
| 7,107,153 B2 * | 9/2006 | Kisra et al. | 702/6 |
| 7,327,287 B2 * | 2/2008 | Martinian et al. | 341/51 |
| 2003/0010493 A1 * | 1/2003 | Hill et al. | 166/65.1 |
| 2004/0225441 A1 * | 11/2004 | Tilke et al. | 702/6 |
| 2005/0189483 A1 * | 9/2005 | Sale | 250/269.3 |
| 2007/0027629 A1 * | 2/2007 | Hassan et al. | 702/11 |
| 2007/0097786 A1 | 5/2007 | Wu | |

(Continued)

FOREIGN PATENT DOCUMENTS

| | | |
|---|---|---|
| CA | 2711908 | 7/2009 |
| EP | 1435529 A1 | 7/2004 |
| GB | 2405509 A | 2/2005 |

OTHER PUBLICATIONS

Combined international Search Report and Examination Report from UK application GB0911809.2 dated Nov. 17, 2009.

(Continued)

*Primary Examiner* — Janet L Suglo
(74) *Attorney, Agent, or Firm* — Blank Rome LLP (57) ABSTRACT

A data reduction method for transmission of a borehole image to the surface of the earth using restricted band widths of LWD telemetry systems. The data reduction method is based on the measurement physics rather than mathematical compression algorithms. Measured data from a sensor are fitted, within the logging tool, to a response function relating sensor response to a parameter of interest. The coefficients of the fitted response function are scaled and then telemetered to the surface. The measured data are reconstructed at the surface by combining the telemetered coefficients with the response function. A borehole image is formed by combining reconstructed reduced data. Parameters of dipping beds intersecting the borehole can be determined from the coefficients.

26 Claims, 10 Drawing Sheets

(56) References Cited

U.S. PATENT DOCUMENTS

| | | | |
|---|---|---|---|
| 2007/0112521 A1 | 5/2007 | Akimov | |
| 2007/0198192 A1 | 8/2007 | Hsu | |
| 2009/0192711 A1* | 7/2009 | Tang | 702/6 |

OTHER PUBLICATIONS

Bernasconi, G., Compression of Downhole Data, 1999 SPE/IADC Drilling Conference, Amsterdam, Holland, Mar. 9-11, 1999, SPE/IADC 52806.

Fulda, C., Real-Time Transmission of High-Resolution Images, 2006 SPE/Europec/EAGE Annual Conference and Exhibition, Vienna, Austria, Jun. 12-15, 2006, SPE 100358.

Gardner, W.R., Real-Time Compression of Logging Data, 1992 European Petroleum Conference, Cannes, France, Nov. 16-18, 1992, SPE 25015.

Mickael, M., Standoff Compensation and Hole Size Correction of a New LWD Density/Neutron Logging System, 2002 SPE Annual Technical Conference and Exhibition, San Antonio, Texas, Sep. 29-Oct. 2, 2002, SPE 77478.

Mickael, M., Design, Calibration, Characterization, and Field Experience of New High-Temperature, Azimuthal, and Spectral Gamma Ray Logging-While-Drilling Tools, 2002 SPE Annual Technical Conference and Exhibition, San Antonio, Texas, Sep. 29-Oct. 2, 2002, SPE 77481.

Examiners Requisition received for corresponding Canadian patent application No. 2,673,083 dated Nov. 22, 2012.

Norwegian Search Report received in corresponding No. Patent Application No. 20092844 dated Nov. 1, 2017, 2 pages.

\* cited by examiner

DATA REDUCTION OF IMAGES MEASURED IN A BOREHOLE

FIELD OF THE INVENTION

This invention is related to the measurement of images of parameters of interest while drilling a well borehole. More particularly, the invention is related to reducing measured image data prior to transmission to the surface of the earth, where the image data reduction results in minimal loss in image resolution. The invention is also used to automatically determine the direction of dipping beds that intersect the borehole.

BACKGROUND

Logging-while-drilling (LWD) systems are used to produce borehole and formation images of several parameters of interest. The logging instrument or "tool" is typically disposed in a collar of the borehole assembly, which is terminated by a drill bit. Data used to generate the images are collected while the LWD logging tool rotates as the drill bit advances the borehole. Images obtained with LWD are obtained from a variety of measurements including natural gamma radiation, bulk density, acoustic properties, and electromagnetic properties such as resistivity. LWD imaging tools typically produce large amounts of data per depth interval of borehole advancement. It is operationally desirable to obtain borehole images in real time at the surface of the earth. Typical LWD telemetry systems include a mud pulse system, electromagnetic telemetry system, or an acoustic telemetry system that uses the drill string as a data conduit. The telemetry rates of these devices range from 1 to 20 bits per second. Because of these slow telemetry rates, imaging data from LWD tools cannot be transmitted to the surface in real time unless the data are significantly compressed.

Several compression methods have been developed over the years to transmit LWD image data in real time. However, these methods use generic and lossy mathematical techniques and typically result in significant loss of data quality.

Once borehole images are obtained, the direction of any dipping beds that intersect the borehole are typically determined by manually correlating centroid tips in the images with absolute measures of azimuthal direction.

SUMMARY OF THE INVENTION

This disclosure is directed toward a data reduction method, rather than a data compression method, for transmission to borehole images the surface of the earth using restricted bandwidths of LWD telemetry systems. The data reduction method is based on the measurement physics rather than mathematical compression algorithms. More specifically, measured data from a sensor are fitted, in a processor disposed within the logging tool, to a predetermined sensor response function relating sensor response to a parameter of interest including changes in formation bed boundaries and dipping angles. The coefficients of this fitted relationship are scaled and then telemetered to the surface. The reduced data are reconstructed at the surface, in a surface processor, by combining the telemetered coefficients with the response function thereby forming reconstructed reduced data. This process conceptually yields a reconstruction of the data measured by the tool. A borehole or a formation image is formed by combining reconstructed reduced data. For a given LWD telemetry bandwidth, the image formed at the surface exhibit superior resolution to those obtained using data compression and decompression algorithms.

Selected coefficients can also be used to identify dipping beds intersecting the borehole, and to further determine a direction of these dipping beds.

BRIEF DESCRIPTION OF THE DRAWINGS

The manner in which the above recited features and advantages, briefly summarized above, are obtained can be understood in detail by reference to the embodiments illustrated in the appended drawings.

DETAILED DESCRIPTION OF THE PREFERRED EMBODIMENTS

The data reduction system will be disclosed in detail using bulk density measurements made with a LWD logging system. Natural gamma ray measurements will also be used to in the description of basic concepts of the data reduction system.

Apparatus

Figure 1:
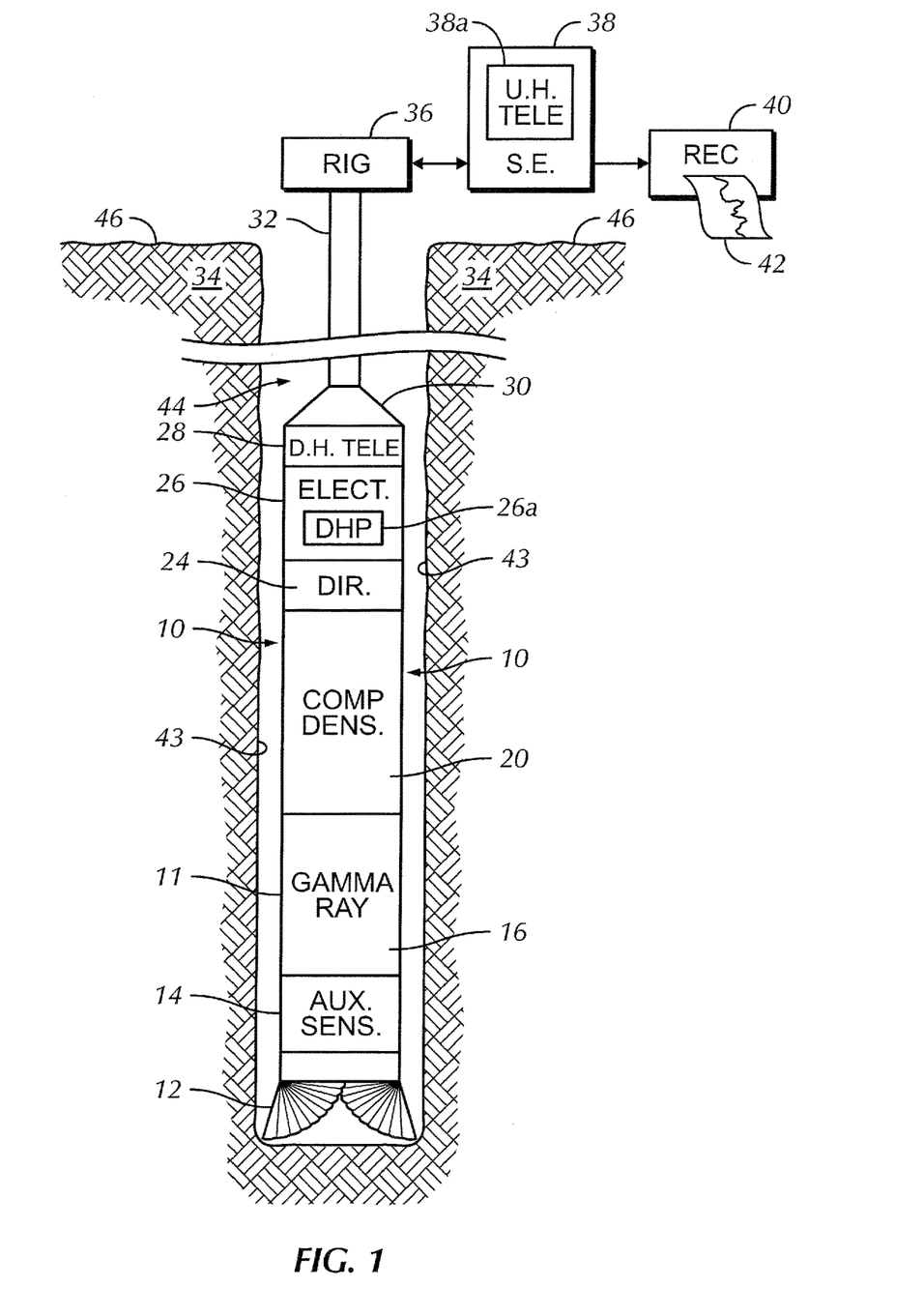
FIG. 1 illustrates a LWD logging system disposed in a borehole drilling environment.

FIG. 1 illustrates a LWD logging system disposed in a borehole drilling environment. The LWD borehole instrument or "tool" component of the borehole assembly is designated as a whole by the numeral 10, and comprises a pressure housing 11 which is typically a drill collar. The tool 10 is disposed within a well borehole 44 defined by borehole walls 43 and penetrating earth formation 34. A drill bit 12 terminates a lower end of the tool 10, and a connector 30 terminates an upper end of the tool. The connector 30 operationally connects the tool 10 to a lower end of a drill string 32. The upper end of the drill string terminates at a rotary drilling rig 36, which is known in the art and is illustrated conceptually at 36.

Again referring to FIG. 1, the tool 10 comprises a gamma ray section 16 that responds to naturally occurring gamma radiation in the formation 34. The compensated bulk density section is shown at 20. Details of LWD gamma ray and bulk density measurements are disclosed in U.S. Pat. No. 6,566, 649 B1, "Standoff Compensation and Borehole and Hole Size Correction of a New LWD Density/Neutron Logging System", SPE 77478, M. Mickael et. al, Sep. 29-Oct. 2, 2002, and "Design, Calibration, Characterization and Field Experience of New High-Temperature, Azimuthal, and Spectral Logging-While-Drilling Tools", SPE 77481, M. Mickael et. al, Sep. 29-Oct. 2, 2002, which are herein entered into this disclosure by reference. The tool 10 can comprise other elements that can be used to complement measurements made with the gamma ray section 16 and the density section 20. In the embodiment shown in FIG. 1, the tool comprises an optional directional section 24 that provides a real time measure of azimuthal angle therefore provides azimuthal orientation of the tool 10 within the borehole 44. The tool 10 can optionally comprise an auxiliary sensor section 14 with one or more auxiliary sensors responsive to a variety of borehole environs parameters such as resistivity and acoustic slowness.

Still referring to FIG. 1, an electronics section 26 provides power and control circuitry for the gamma ray section 16, density section 20, the optional directional section 24, and any optional auxiliary sensors in the auxiliary sensor section 14. Power is typically supplied by batteries, but may be supplied by a mud powered turbine generator (not shown). The electronics section also comprises a first or "downhole" processor 26a in which various computations of the data reduction method are performed in real time. The electronics section 26, including the downhole processor 26a, is operationally connected to a first or "down hole" telemetry unit 28. Data from elements within the tool 10, including coefficients used in the data reduction method, are telemetered to the surface 46 of the earth by means of a suitable telemetry system. Suitable telemetry systems include a mud pulse system, and electromagnetic telemetry system, or an acoustic telemetry system that uses the drill string 32 as a data conduit. The telemetered data are received by a second or "up hole" telemetry element 38a preferably disposed in a surface equipment module 38. As the borehole assembly comprising the logging tool 10 is conveyed along the borehole 44 by the drill string 32. Reconstructed reduced data and resulting borehole images, and other parameter of interest, are input to a recorder 40. The recorder 40 tabulates the data as a function of depth within the borehole 44 at which they are measured. The recorder output 42 is typically a "log" of the data as a function of borehole depth.

Typically, each tool section is equipped with electronics circuitry and power such as batteries so that these sections can be interchanged as required to assembly a multiple section logging tool.

As stated previously, the tool housing 11 is typically a steel drill collar with a conduit through which drilling fluid flows. Elements of the tool 10 illustrated conceptually in FIG. 1 are typically disposed within the wall of the drill collar pressure housing 11.

Basic Concepts

As stated previously, the data measured by the logging tool 10 are reduced in the downhole processor 26a prior to telemetry rather compressed as in prior art systems. The data reduction is based upon a response function that represents the measurement physics of the logging tool 10 rather than upon mathematical compression algorithms. The concept of measurement physics response function will be illustrated using the following examples.

A tool rotating in a borehole at or near an interface between two formations exhibits similar response to the one encountered when the tool passes an interface as it penetrates the formation. One response function ƒ(x), which yields a parameter of interest measured as a function of depth in the borehole, is often described by a sigmoid function and given by $$f(x) = \frac{A}{1 + e^{-\frac{(x-x_0)}{\sigma}}} \quad (1)$$

where:
x=depth of the measurement in the borehole;
A=the measured value of the parameter of interest in the formation before approaching the interface;
$x_0$=the depth of the bed boundary interface; and
σ=a known calibration parameter proportional to the vertical resolution of the tool.

Figure 2:
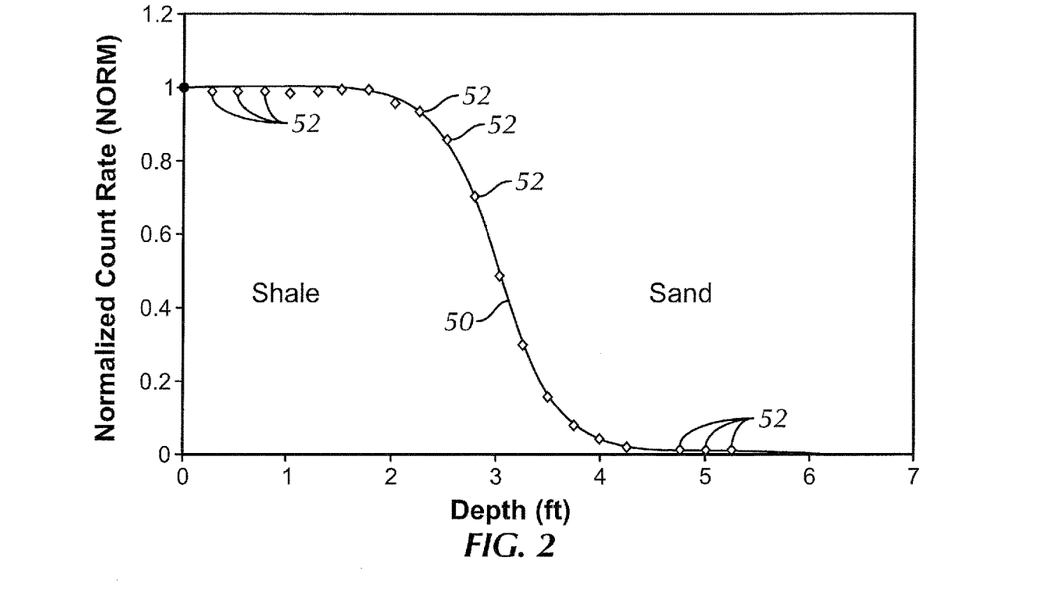
FIG. 2 shows an example of the normalized response of a hypothetical gamma ray tool as it passes through an interface between a clean sand and a shaly formation.

FIG. 2 shows an example of the normalized response of a hypothetical gamma ray tool as it passes through an interface between a clean sand (lower formation) and a shaly formation (upper formation). Measurements are shown for a depth interval (abscissa) ranging from XXX0 feet to XXX7 feet, with the sand shale interface at a depth XXX3 feet. The interface is assumed to be perpendicular to the axis of the borehole. The shale is assumed to have a normalized natural gamma ray count rate (ordinate) of A=1, and the clean sand is assumed to have a normalized natural gamma ray count rate of A=0. Normalized count rate measured by the gamma ray tool is illustrated by the data point symbols 52, with only some being identified to simplify the illustration. The curve 50 is the sigmoid response function of equation (1) and yields an excellent fit to the measured data points 52. Sigmoid response function coefficients represent either measured quantities or known physical constants of the tool. The measured data response of the tool can therefore be reconstructed using the measurement physics response function and appropriate values for the coefficients. Stated another way, sigmoid response function coefficients, rather than measured data points, can be telemetered to the surface and combined with the response function to "reconstruct" the tool response. This methodology reduces band width requirements of the telemetry system.

In is instructive to consider another example of data reduction is based upon another measurement physics response function, rather than upon mathematical compression algorithms. In this example, the formation bed boundary is not perpendicular to the borehole, but intersects the borehole at an angle at a "dip". This type of bed structure is commonly referred to be referred to as "dipping" beds. A hypothetical logging tool therefore responds azimuthally as well as vertically as it traverses the dipping bed boundary. The main difference between this example and the "horizontal" bed boundary response of the previous example is that the azimuthal tool response function ƒ(φ) has a closed loop due to the circular nature of rotation of the LWD logging tool. The azimuthal response at a bed boundary can generally be described by a double sigmoid response function given by $$f(\phi) = \frac{A}{1+e^{-\frac{(\phi-\phi_1+c/2)}{\sigma_1}}}\left[1 - \frac{1}{1+e^{-\frac{(\phi-\phi_2-c/2)}{\sigma_2}}}\right] \quad (2)$$

where $\phi$=the azimuthal angle;

A=the maximum tool response to the parameter of interest;

$\phi_1$ and $\phi_2$=the two angles defining the bed boundary intersection of the borehole;

c=a coefficient proportional to the azimuthal span of one of the beds; and $\sigma_1$ and $\sigma_2$=coefficients proportional to the azimuthal resolution of the tool in the two intersecting formations.

Fits between measured data and the double sigmoid response function of equation (2) are similar to that shown in FIG. 2. As in the previous example, double sigmoid response function coefficients, rather than measured count rate data points, can be telemetered to the surface and combined with the double sigmoid response function to reconstructed tool response in "dipping" bed boundaries. Again, this reduces band width requirements of the telemetry system.

A tool response function $f(\phi)$ to both dipping and horizontal beds can also be described by a modified Gaussian function $$f(\phi) = A_5 + A_4 e^{-0.5\left(\frac{|\phi-A_1|}{A_2}\right)^{A_3}} \quad (3)$$

where $\phi$=the azimuthal angle;

$A_1$=a coefficient representing the angle of the azimuthal interface measured with respect to the borehole axis;

$A_2$=a coefficient proportional to the azimuthal resolution of the tool;

$A_3$=a coefficient equal to the contrast between the two beds crossed;

$A_4$=a coefficient that is the difference of tool response amplitude between the two formations; and $A_5$=a coefficient equal to the tool amplitude of one of the formations.

Figure 3:
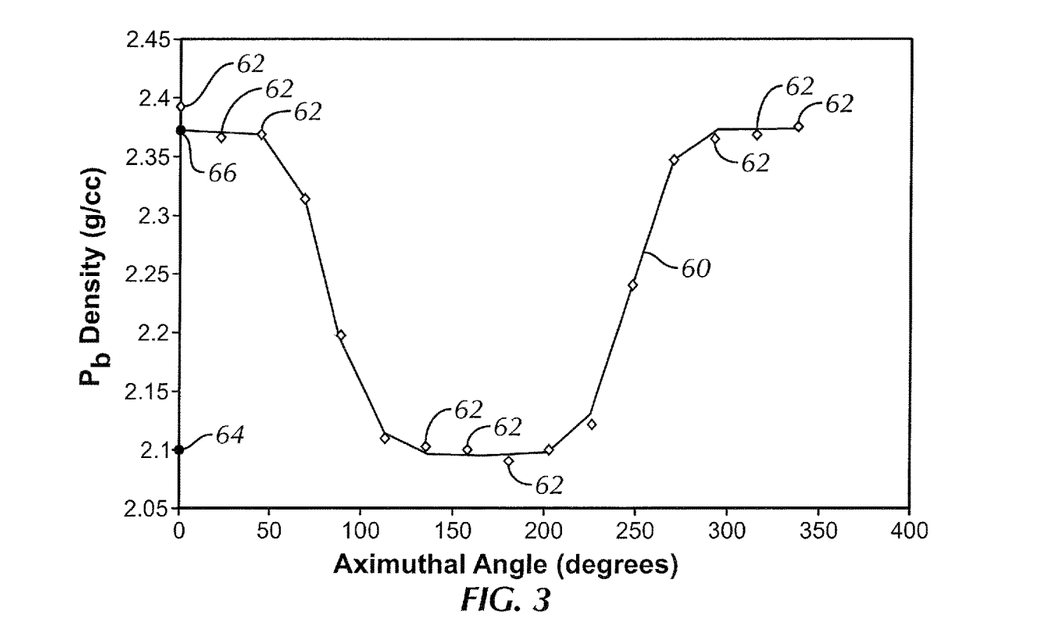
FIG. 3 illustrates the response of a hypothetical LWD density tool as it rotates at a depth in a borehole that is intersected by two dipping beds.

FIG. 3 illustrates the response of a hypothetical LWD density tool as it rotates at a depth in a borehole that is intersected by two dipping beds of density 2.37 grams per cubic centimeter (gm/cc) and 2.10 gm/cc. The ordinate is bulk density $\rho_b$ measured by the tool oriented when oriented at an azimuthal angle $\phi$ (abscissa). Measured data points are indicated by the symbols 62, with only some being identified simplify the illustration. The maximum and minimum values of bulk density are indicated at 66 and 64, respectfully.

Still referring to FIG. 3, the curve 60 is obtained by fitting the modified Gaussian response function of equation (3) to the measured bulk density data points 62. As defined above, the modified Gaussian response function comprises coefficients $A_i$ where i=(1, . . . , 5). In order to reduce measured data for effective use of telemetry, it is necessary to determine all values $A_i$ from the fitting process. The modified Gaussian response function $f(\phi)$ is non-linear and finding the coefficients $A_i$ by fitting the response function to measured data 62 requires iterative non-linear least-squares methods. Fortunately, the three non-linear parameters of the modified Gaussian response function ($A_1$, $A_2$, and $A_3$) have limited ranges. More specifically, $A_1$ and $A_2$ are angles between 0 to 360 degrees and $A_3$ ranges from 1 to 8. These limitations make the non-linear search easier and faster. The linear coefficients $A_4$ and $A_5$ can be quickly determined from a linear least-squares fit. The entire process is, however, iterative and requires several tens of iterations to obtain the correct coefficients $A_i$ from fits of the modified Gaussian response function to the measured data. For the example shown in FIG. 3, the modified Gaussian response function fitted to the measured bulk density data 62 is represented by the curve 60 and yields the following values for the coefficients $A_i$:

$A_1$=165 degrees $A_2$=77 degrees $A_3$=5

$A_4$=−0.27 g/cc $A_5$=2.37 g/cc  (4)

The fit between data and response function is excellent leading one to the conclusion that the above coefficients $A_i$ can be used to accurately reconstruct the reduced data to simulate the measured data response of the density tool.

Implementation

Low resolution borehole images, such as those obtained from gamma ray, neutron, and density tools, mainly delineate interfaces between formations (or beds) and cannot resolve smaller structures such as fractures or vugs. The data reduction methods disclosed herein can be used to describe the majority of features encountered by low-resolution imaging devices. Conversely, high-resolution imaging devices such as resistivity and acoustic imagers can resolve structures on much smaller scale, and the methods of this invention no longer provide a complete and accurate representation of the tool image response. Implementation of the data reduction methodology of this invention will be presented using measures of bulk density as an example.

The perimeter of the borehole is divided into a predetermined number of azimuthal arcs or azimuthal "bins" $\phi_i$ over which corresponding values of density $\rho(\phi_i)$ are measured. Typically 16 bins that are equal and contiguous (i.e. 22.5 degrees apart) yield sufficient resolution over a full 360 degree rotation of the LWD tool. Other numbers, sizes and azimuthal bin arrangements can be used depending upon resolution requirements. As an example, the predetermined number of azimuthal bins can be increased if increased azimuthal resolution is required. This increase will not result in increased data telemetry requirements since data from the bins are fitted to the modified Gaussian response function in the downhole processor. With the tool at a depth x in the well borehole, corresponding values of $\rho(\phi_i)$ are summed over a predetermined depth interval $\Delta x$ as the tool is conveyed in the borehole. The depth increment is typically about 6 inches (15.24 centimeters). This yields a set of measures values of bulk density $\rho_x(\phi_i)$ where (i=1, 2, . . . , 16) for 16 bins. The modified Gaussian response function of equation (3) is then fitted to the data set $\rho_x(\phi_i)$, as discussed above, to yield a set of coefficients $A_{i,x}$ (i=1, . . . , 5) for the depth x in the borehole. The coefficients $A_{i,x}$ determined from the nonlinear fit are preferably scaled to a predetermined number of bits, according to the significant digits of the coefficients, to reduce the overall size of the data package to be transmitted over the LWD telemetry system. It has been determined that a total of 32 bits can be used to package the five coefficients with high accuracy regardless of the number of bins used to collect the data. This provides a high fidelity representation of the image in about one forth the size of the recorded image if the data is collected in 16 bins.

Referring again to FIG. 1, the above described fitting is performed in the downhole processor 26a. The set of coefficients $A_{i,x}$ (i=1, . . . , 5) is then scaled to 32 bits as described above using the downhole processor 26a, and then transmitted to the surface equipment 38 via the downhole telemetry unit 28 cooperating with the uphole telemetry unit 38a. At the surface, the modified Gaussian response function and the set of coefficients $A_{i,x}$ (i=1, . . . , 5) are input into a second or "uphole" processor (not shown) in the surface equipment 38 where they used to reconstructed the set of measured bulk density value $\rho_x(\phi_i)$ where (i=1, 2, . . . , 16 or more) for a depth x in the well borehole 44. Depth is incremented by $\Delta x$ and the process is repeated. Results of the reconstructed bulk density measurements are recorded as a function of depth x by the recorder 40. The result of this methodology is an image 42 of borehole density, as will be illustrated and discussed in detail in a subsequent section of this disclosure.

Figure 4:
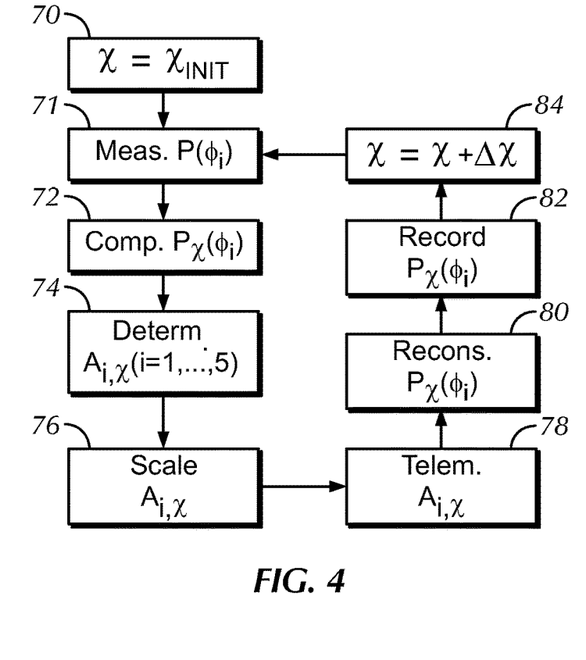
FIG. 4 is a flow chart of the data reduction method of this invention.

FIG. 4 is a flow chart of the above method. Depth x is initiated at 70. Bulk density values bulk density value $\rho_x(\phi_i)$ for a single revolution of the tool are measured at 71. Bulk density values are summed for each bin over the depth interval $\Delta x$ to obtain $\rho_x(\phi_i)$ at 72. Values of $\rho_x(\phi_i)$ are fitted to the modified Gaussian response function (equation (3)) to obtain $A_{i,x}$ (i=1, . . . , 5) at 74. Values of $A_{i,x}$ are scaled to preferably 32 bits at 76, and telemetered to the surface at 78. Values of $\rho_x(\phi_i)$ are reconstructed at the surface at 80 and recorded as a function of depth at 82. Depth x is incremented at 84 and the process is repeated thereby generating a map of bulk density as a function of borehole azimuth and depth. As discussed previously, the telemetered coefficients are combined at the surface with the response function to form reconstructed reduced data, which represents data measured by the tool.

Even though other response functions can be used such as the double sigmoid response function of equation (2), the modified Gaussian response function of equation (3) has the smallest number of coefficients, yet provides the same accuracy obtained from more complicated response functions. The five coefficients $A_i$ when scaled to 32 bits typically provide required accuracy of the resulting borehole images.

Figure 5:
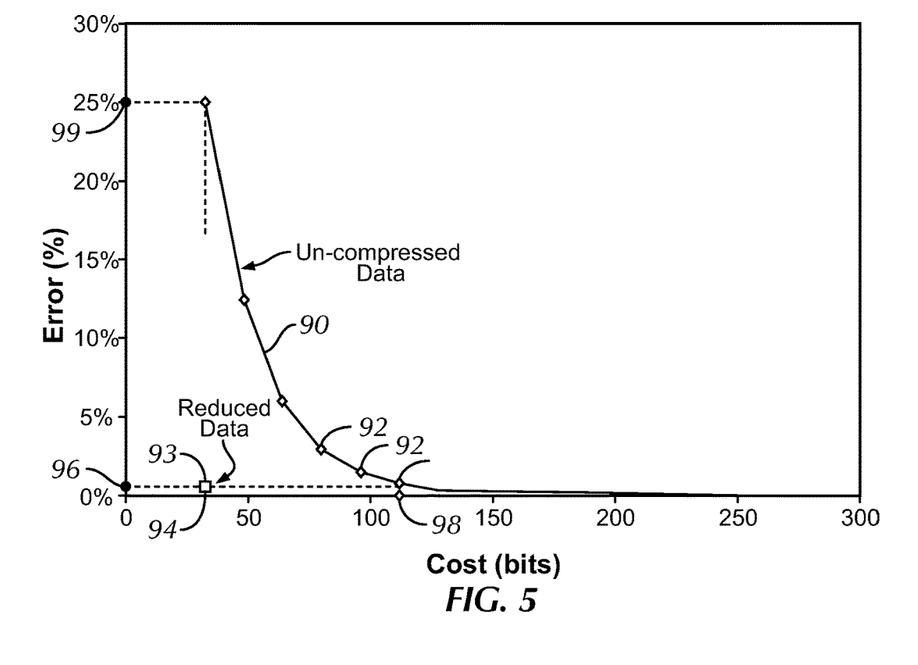
FIG. 5 illustrates the savings in the number of telemetered bit achieved by the data reduction method of this invention.

FIG. 5 illustrates the savings in the number of telemetered bit achieved by the data reduction method of this invention. The ordinate is an error function, in percent, that is induced by data transmission. The abscissa is the number of bits transmitted or "cost". Data points 92 represent the error versus cost of telemetering uncompresed data. A curve 90 has been drawn through these data points. It can be see that to telemeter the tool response as 32 bits of uncompressed data at 94, the error will be about 25 percent as indicated at 99. To obtain an error of about 1 percent as shown at 96, about 115 bits of uncompressed data would have to be telemetered as shown at 98. The point 93 represents reduced data using the methodology of this invention using a 32 bit scaling of response function coefficients. It can be seen that an error of about 1 percent can be obtained with a telemetry cost of only 32 bits.

Results

1. Borehole Images

The results of the data reduction method are illustrated using figures of six borehole bulk density images. Three of the six images are generated using a static bulk density scale. The range of the static scale is "fixed" and ranges from value $\rho_b$=2.0 to 3.0 gm/cc. The remaining three images are generated using a dynamic bulk density scale. The dynamic images are made by scaling $\rho_b$ using different minimum and maximum values over a predetermined depth interval. This technique enhances the detail of the images. Furthermore, each figure illustrates images generated with uncompressed data, data reduced using the methodology of this invention, and data reduced using generic mathematical compression algorithms. The uncompressed or "recorded" images are obtained after the drilling operation is completed by downloading the azimuthal data stored in the down-hole tool. Each of the uncompressed, reduce and compressed images is shown in both static and dynamic format. Both reduced and compressed images use 32 bits of telemetered data. All images represent bulk density using a gray scale with darker areas representing greater values. The ordinate is depth x and the abscissa represents borehole azimuthal angle $\phi$. The annotations T, R, B, and L indicate the top right side, bottom, and left side of the borehole, respectively, and are preferably determined using the directional section 24 of the LWD logging tool 10 (see FIG. 1). Each static image illustrates an average formation bulk density curve obtained from the azimuthal bulk density measurements. All images in a given figure are measured over the same depth interval.

Figure 6:
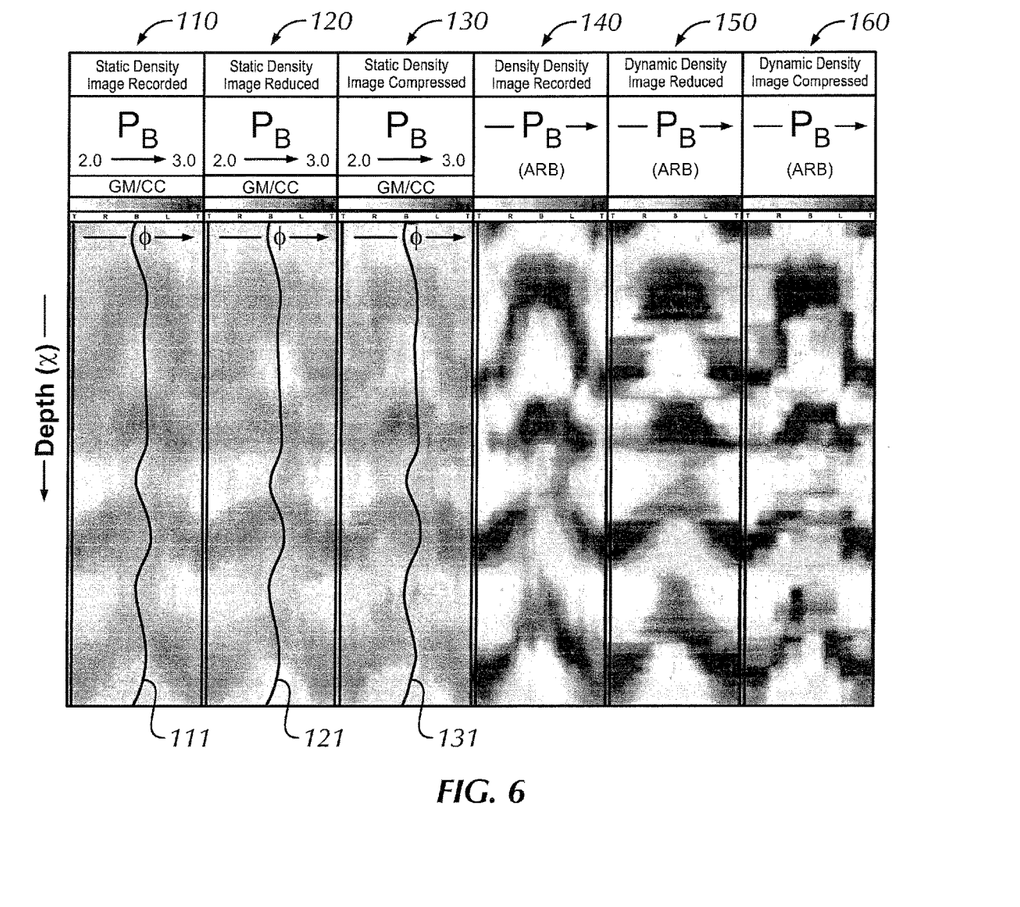
FIG. 6 shows bulk density images generated in a medium density contrast zone.

FIG. 6 shows static images 110, 120 and 130 representing recorded, reduced and compressed images, respectfully. Curves 111, 121 and 131 are average bulk density logs as defined previously. Dynamic images 140, 150 and 160 representing recorded, reduced and compressed images, respectfully. The images encompass a sequence of beds with medium bulk density contrast. It is apparent that static and dynamic images 120 and 150 exhibit better bed resolution than corresponding static and dynamic images 130 and 160 generated using mathematical data compression methodology.

Figure 7:
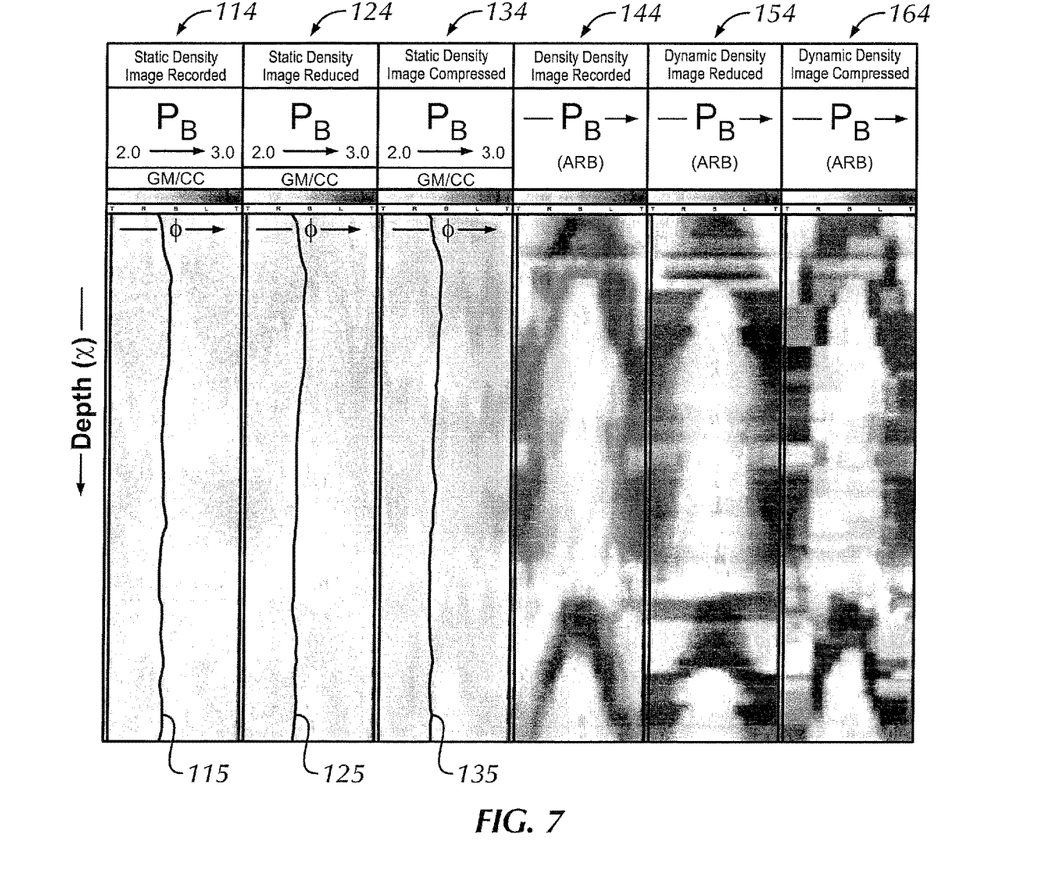
FIG. 7 shows bulk density images generated in a low density contrast zone.

FIG. 7 illustrates results in a low density contrast zone, and shows static images 114, 124 and 134 representing recorded, reduced and compressed images, respectfully. Curves 115, 125 and 135 are average bulk density logs as defined previously. Dynamic images 144, 154 and 165 representing recorded, reduced and compressed images, respectfully. It is again apparent that static and dynamic images 124 and 154 exhibit better bed resolution than corresponding static and dynamic images 134 and 164 generated using mathematical data compression methodology. It is, in fact, difficult to see the bedding planes in the compressed image 134. The dynamic compressed image 164 better illustrated the bedding planes, but it is still inferior to the dynamic reduced image 154.

Figure 8:
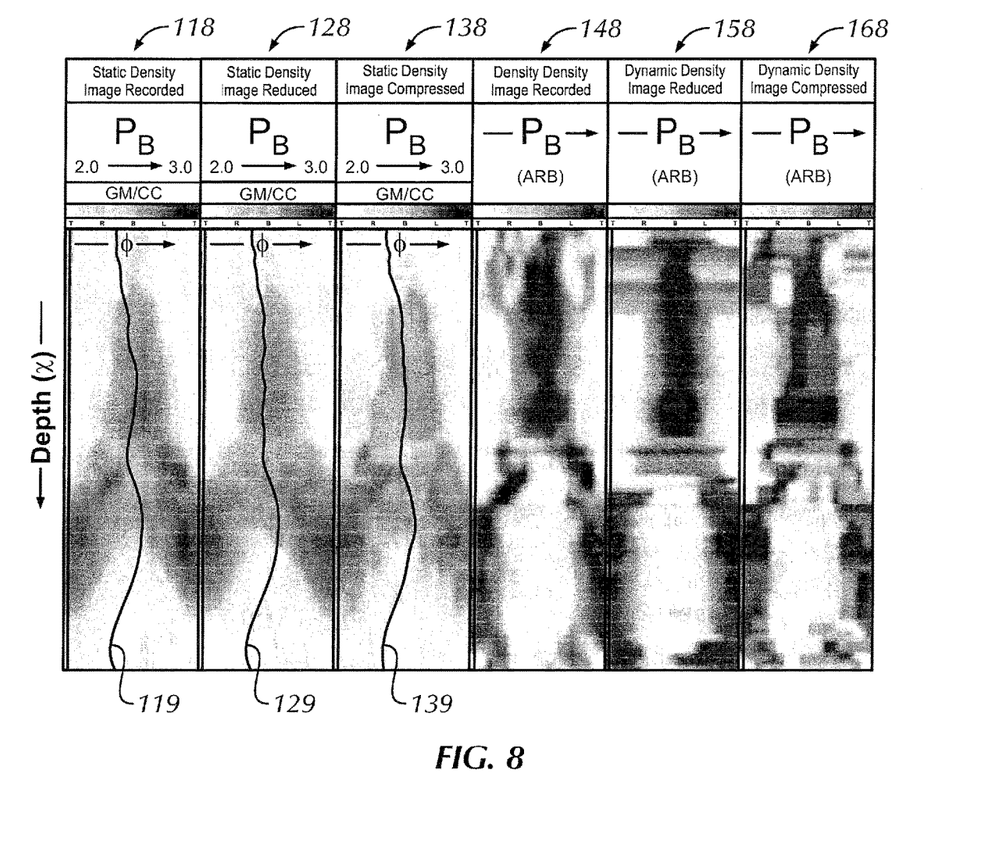
FIG. 8 shows bulk density images generated in a high density contrast zone.

FIG. 8 illustrates results in a high density contrast zone, and shows static images 118, 128 and 138 representing recorded, reduced and compressed images, respectfully. Curves 119, 129 and 139 are average bulk density logs as defined previously. Dynamic images 148, 158 and 168 representing recorded, reduced and compressed images, respectfully. Both static and dynamic reduced and compressed images show the high contrast bedding planes, but again the reduced static and dynamic images are superior in resolution to the corresponding static and reduced compressed images.

To summarize the results shown in FIGS. 6, 7 and 8, the data reduction methodology of this invention maintains virtually all the features of the "recorded" image except those that are due to borehole breakouts that do not fit the modified Gaussian equation. However, for real-time LWD and Measurement-while-drilling (MWD) geosteering applications, delineation of bed boundaries is the primary application for the density and gamma ray imaging. Increased accuracy obtained using data reduction is advantageous for these applications.

2. Automatic Determination of Dipping Beds

Attention is again directed to the modified Gaussian response function of equation (3) and the fit coefficients $A_i$ (i=1, . . . , 5).

As defined previously, $A_1$ is a coefficient representing an angle of the azimuthal interface measured with respect to the borehole axis. More specifically $A_1$ is a centroid that is the exact azimuthal position of the tips of a sinusoid representing the tool response to a dipping bed interface. The position of this centroid is, therefore, required to place the sinusoid in the correct azimuthal position thereby identifying the direction of bed dip. Small errors in sinusoid placement can result in large errors in a bed dip directional determination. The parameter $A_1$ is, therefore, used to accurately determine the direction of dip in the automatic "dip picking" methodology of this invention.

As defined previously, $A_4$ is a coefficient that is the difference of tool response amplitude between two formations. If dipping beds of contrasting densities intersect the borehole, $A_4$ represents the maximum density difference or density "contrast" of these beds. Variations in the coefficient $A_4$ can, therefore, be used to identify the presence of dipping beds. From values of $A_1$ and $A_4$, the existence of and the direction of dipping beds can be determined automatically as a function of depth in the borehole without the need to manually identify sinusoid tips in a borehole image.

Figure 9:
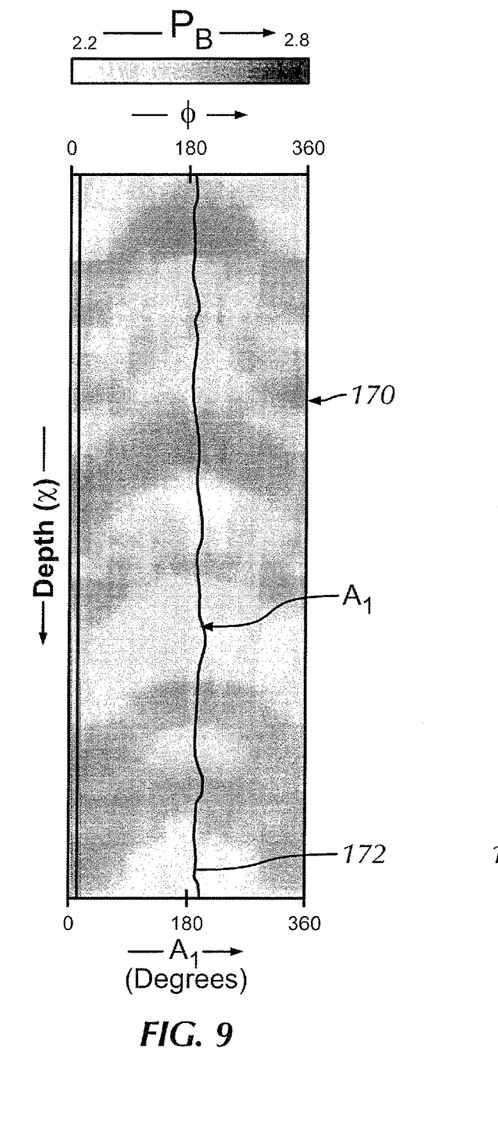
FIG. 9 shows a bulk density borehole image with a fit coefficient superimposed and indicating the direction of bed boundary dip.

FIG. 9 is a bulk density borehole image 170 generated as discussed in the previous section of this disclosure and using a static bulk density span ranging from 2.2 to 2.8 gm/cc. Values of the density used to create the image are depicted using a gray scale with darker areas representing greater values. It should be understood that this convention can be reversed, with lighter areas representing greater values. The ordinate is again depth x and the abscissa represents borehole azimuthal angle $\phi$ ranging from a reference angle 0 to 360 degrees. The azimuthal angles are preferably measured with respect to an absolute reference angle such as true north in vertical wells or high side in horizontal wells. The absolute reference angle and other azimuthal angles are preferably determined using the directional section 24 of the LWD logging tool 10 (see FIG. 1). The curve 172 represents the coefficient $A_1$ with a scale varying from 0 to 360 degrees. A visual observation of the image 170 clearly shows bed boundary interfaces dipping at approximately 180 degrees). The curve 172, which varies slightly from a value of 180 degrees (see bottom scale for $A_1$) as a function of depth x, quantitatively verifies this observation. It is noted that the image 170 is not needed to determine the direction of bed dip, but is provided only to show the effectiveness of the coefficient $A_1$ in providing an accurate directional indication that requires no subjective examination of the image.

Figure 10:
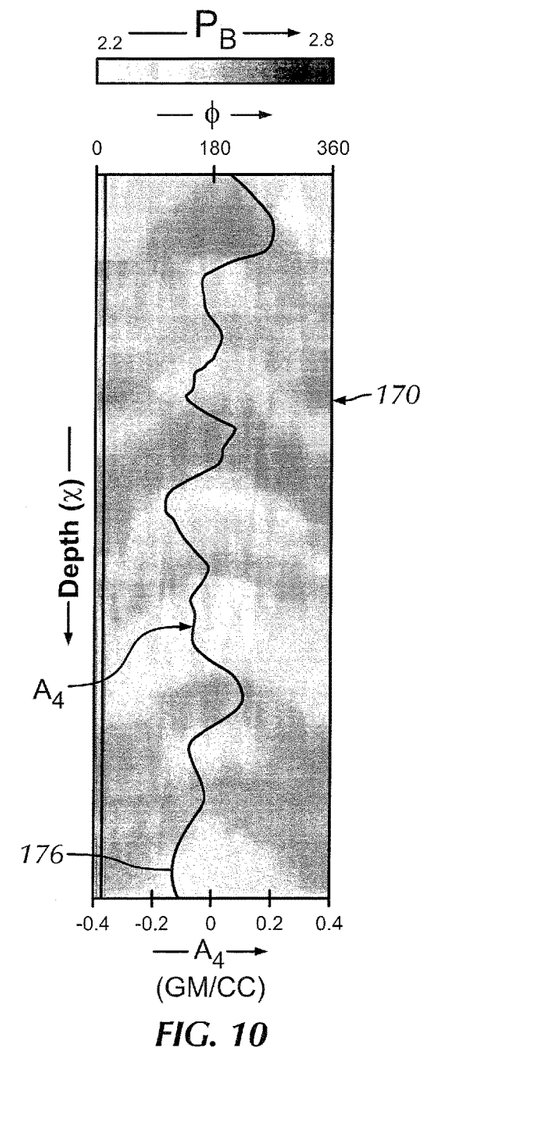
FIG. 10 shows the same bulk density borehole image with a fit coefficient superimposed and indicating density contrast of dipping beds.

FIG. 10 is the same bulk density borehole image 170 as shown in FIG. 9, with the static bulk density span again ranging from 2.2 to 2.8 gm/cc. The curve 176 represents the coefficient $A_4$ with a scale varying from −0.4 to +0.4 gm/cc. At depths x where the density contrast varies from zero, the corresponding value of $A_4$ is greater or less than zero. Conversely, at depths x where the density contrast approaches or is zero, the corresponding value of $A_4$ is smaller or zero. Stated another way, values of $A_4$ greater than or less than zero indicate that dipping bed interfaces intersect the borehole. It is again noted that the image 170 is not needed to determine density contrast of the dipping beds, but is provided only to show the effectiveness of the coefficient $A_4$ in providing an accurate density contrast indication that requires no subjective examination of the image.

Figure 11:
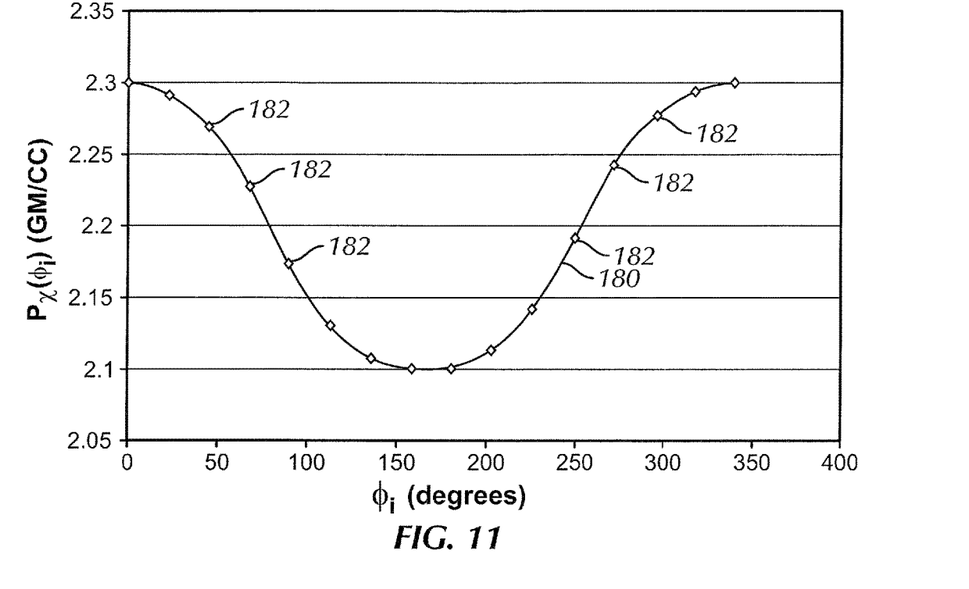
FIG. 11 illustrates the response of a hypothetical LWD density tool as it rotates at in a borehole that is intersected by two dipping beds of density 2.30 gm/cc and 2.10 gm/cc.

FIG. 11 illustrates the response 180 of a hypothetical LWD density tool as it rotates at a depth x in a borehole that is intersected by two dipping beds of density 2.30 grams per cubic centimeter (gm/cc) and 2.10 gm/cc. The ordinate is bulk density $\rho_x(\phi_i)$ measured by the tool oriented when oriented at an azimuthal angle $\phi_i$ (abscissa). Using previously defined notation convention, the subscript "i" indicates the azimuthal bins in which the density measurement is made. The measured data points are indicated by the symbols 182, with only some being identified simplify the illustration. It is apparent that the direction of dip is about 180 degrees as indicated by the minimum in the curve 180. As discussed previously, the curve 180 is obtained by fitting the modified Gaussian response function of equation (3) to the measured bulk density data points 182.

Figure 12:
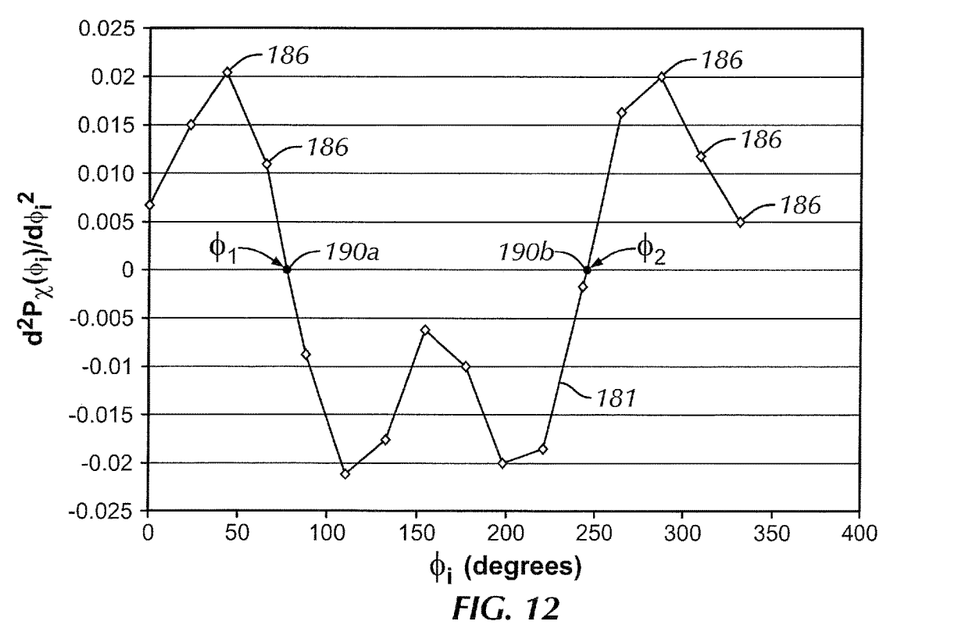
FIG. 12 illustrates the second derivative of the curve depicted in FIG. 11.

FIG. 12 illustrates the curve 181 which is the second derivative of the curve 180 depicted in FIG. 11. The ordinate is $d^2\rho_x(\phi_i)/d(\phi_i)^2$ and the abscissa is again $\phi_i$. The second derivatives of the measured data points are indicated by the symbols 186, again with only some being identified simplify the illustration. The zero crossings 190a and 190b of the curve 181 are the azimuthal angles $\phi_1$ and $\phi_2$ (defined in equation (2)) at which the bed boundary interface intersects the borehole at a depth x.

To summarize, a first fit coefficient ($A_1$) and a second fit coefficient ($A_4$) to a modified Gaussian response function are examined as a function of depth. Variation in the coefficient $A_4$ that are greater or less than zero indicate a dipping bed interface that intersects the borehole. The magnitude of the coefficient $A_1$ 90 to 360 degrees) indicates the direction of bed dip with respect to a predetermined azimuthal reference angle. Finally, the zero crossings of second derivative $d^2\rho_x(\phi_i)/d(\phi_i)^2$ yield the azimuthal angles $\phi_1$ and $\phi^2$ at which the bed boundary interface intersects the borehole at a depth x.

Figure 13:
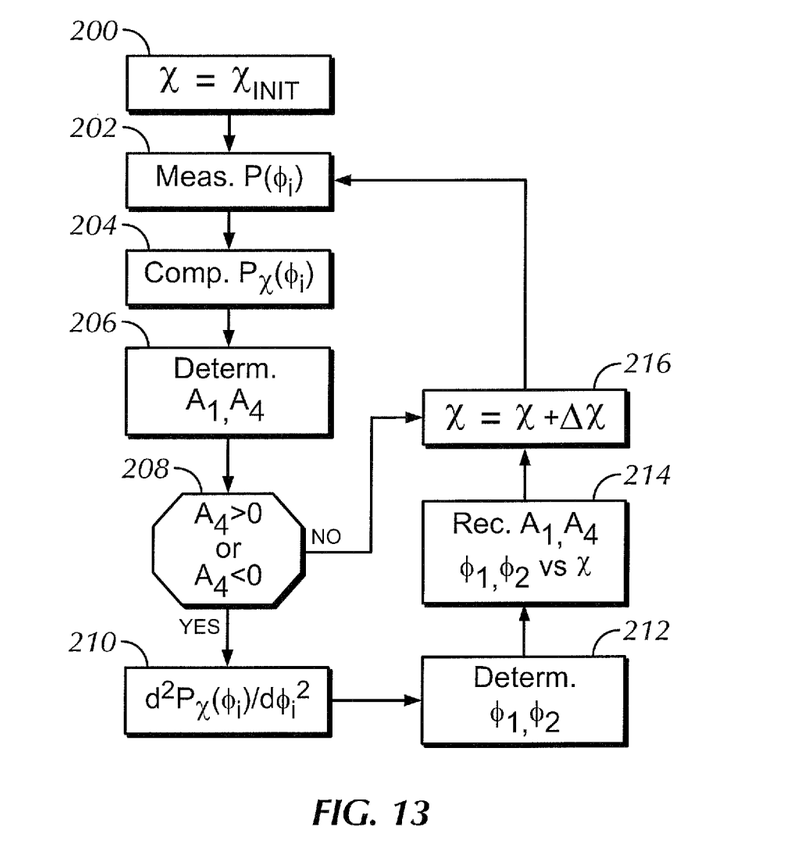
FIG. 13 is a flow chart of an algorithm for measuring parameters of dipping beds that intersect a borehole.

FIG. 13 is a flow chart of the above method for automatically measuring parameters of dipping beds that intersect a borehole. Depth x is initiated at 200. Bulk density values $\rho_x(\phi_i)$ for a single revolution of the tool are measured at 202. Bulk density values are summed for each bin "i" over the depth interval $\Delta x$ to obtain $\rho_x(\phi_i)$ at 204. Values of $A_1$ and $A_4$ are determined from the fit of $\rho_x(\phi_i)$ values to the modified Gaussian response function at 206. $A_4$ is checked at 208 for values greater or less than zero. If no variation from zero is found, there is no intersecting dipping bed interface at depth x. The depth is, therefore, incremented at 216 and the processing returns to step 202. If a variation from zero in $A_4$ is detected, a dipping bed interface is intersecting the borehole. The second derivative $d^2\rho_x(\phi_i)/d(\phi_i)^2$ is computed at 210 and the azimuthal angles of zero crossing, $\phi_1$ and $\phi_2$, are determined at 212. Parameters of interest are recorded as a function of depth x at 214, depth is incremented at 216, and processing is returned to step 202. This process is repeated thereby generating one or more image "maps" of changes in bulk density and direction of dipping beds as shown in FIGS. 9 and 10. The computations are preferably performed in the downhole processor 26a (see FIG. 1) with results being telemetered to the surface equipment 38 and subsequently to the recorder 40 in which the map is generated.

Figure 14:
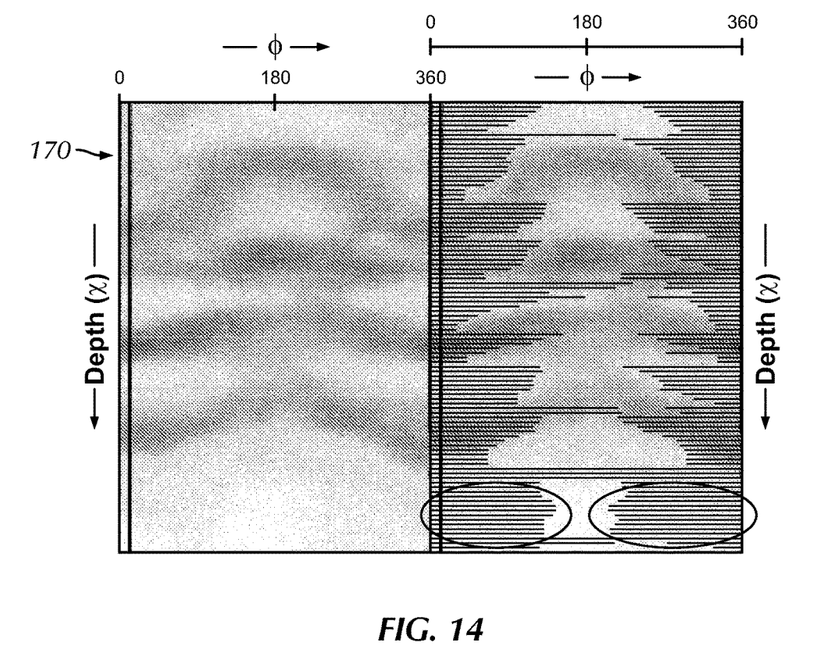
FIGS. 14, 14(a) and 14(b) illustrate a map of azimuthal angles of intersection of dipping beds as a function of borehole azimuth and depth.
Figure 14A:
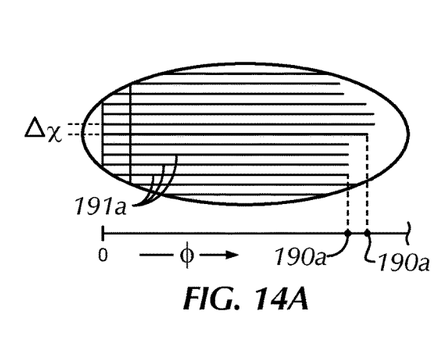
Figure 14B:
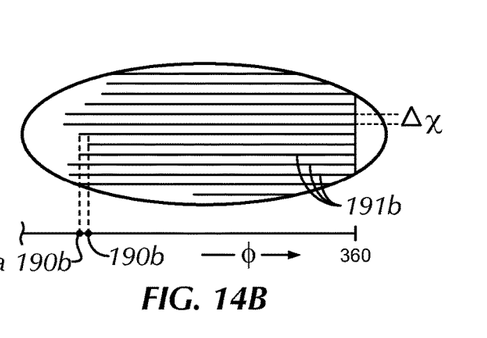

Using the algorithm in FIG. 13, a map of azimuthal angles of intersection of dipping beds as a function of borehole azimuth and depth can be generated. FIG. 14 shows an example of such an image map. The left image is a portion of the same image 170 of changes in bulk density as a function of azimuthal angle shown in FIGS. 9 and 10. The right image is the same image 170 with lines 191a and 191b for each depth increment Δx extending from azimuthal angle 0 and 360 to the azimuthal angles of zero crossing $\phi_1$ and $\phi_2$, respectively (see FIG. 12). Details of this image presentation are more clearly seen in expanded insert FIG. 14a which illustrates a line 191a at each depth interval Δx extending from $\phi_i=0$ to zero crossing angle $\phi_1$ identified at 190a. Likewise, expanded insert FIG. 14b illustrates a line 191b at each depth interval Δx extending from $\phi_i=360$ degrees to zero crossing angle $\phi_2$ identified at 190b. It is apparent that the right side of FIG. 14 provides an image clearly depicting the geometry of intersecting beds. It is again noted that no manual analysis of the density image is required to generate this image map.

The above disclosure is to be regarded as illustrative and not restrictive, and the invention is limited only by the claims that follow.

What is claimed is:

1. A method of improving imaging of a formation feature intersected by a borehole in a formation by improving transmission of image data from the borehole to surface equipment at surface, the method comprising:
    drilling the borehole in the formation;
    imaging the formation by measuring, while drilling the borehole, borehole image data of the intersected formation feature in the borehole using a logging tool sensor of a logging tool disposed in the borehole;
    performing within the logging tool disposed in the borehole, the steps of:
        fitting the measured borehole image data to an azimuthally dependent response function of the logging tool sensor, the response function representing measurement physics of the logging tool, wherein the fitting includes determining one or more response function coefficients;
        scaling the one or more response function coefficients to a predetermined number of bits, wherein the scaled coefficients combined with the response function represent reduced measured data; and
        telemetering the scaled coefficients to the surface equipment using a telemetry unit of the logging tool; and
    generating, from the response function and the telemetered scaled coefficients, a resulting borehole image at the surface to determine a characteristic of the intersected formation feature.

2. The method of claim 1 wherein the response function is a modified Gaussian function having five coefficients.

3. The method of claim 2 wherein:
    variation in at least one of the response function coefficients indicates a dipping bed interface intersecting the borehole; and
    magnitude of at least one of the response function coefficients indicates an azimuthal direction of the dipping bed interface.

4. The method of claim 3 wherein zero crossings of a second derivative of said response function yields azimuthal angles at which a bed boundary interface intersects said borehole.

5. The method of claim 2 wherein the response function is of the form $$f(\phi) = A_5 + A_4 e^{-0.5\left(\frac{|\phi - A_1|}{A_2}\right)^{A_3}}$$

wherein:
    $\phi$ is an azimuthal angle;
    A1 is a coefficient representing an angle of azimuthal interface with a dipping bed, the angle of azimuthal interface being measured with respect to the borehole's longitudinal axis;
    A2 is a coefficient proportional to an azimuthal resolution of the tool;
    A3 is a coefficient indicative of a contrast between two beds crossed;
    A4 is a coefficient indicative of a difference of tool response amplitude between two formations; and
    A5 is a coefficient indicative of a tool response amplitude for one of the formations.

6. The method of claim 1 further comprising:
    performing at the surface equipment, the steps of:
        receiving the telemetered coefficients from the logging tool; and
        combining the received coefficients with the response function to reconstruct reduced data thereby forming the resulting borehole image.

7. The method of claim 1, further comprising determining, at surface, the characteristic of the intersected formation feature.

8. The method of claim 7, wherein determining, at surface, the characteristic of the intersected formation feature comprises determining, at surface, a direction of a dipping bed intersected by the borehole.

9. A logging tool for improving imaging of a formation feature intersected by a borehole in a formation by improving transmission of image data from the borehole to a surface-located telemetry unit at surface, the logging tool comprising:
    a logging tool body disposed on a drilling assembly drilling the borehole in the formation;
    a logging tool sensor disposed on the logging tool body and measuring, while drilling the borehole, data representative of a borehole image of the intersected formation feature in the borehole;
    a processor disposed on the logging tool body, the processor operationally connected to the logging tool sensor and programmed to:
        fit the measured data representative of the borehole image to a response function of the logging tool sensor, the response function representing measurement physics of the logging tool, wherein the fitting includes determining one or more response function coefficients; and
        scale the one or more response function coefficients to a predetermined number of bits; and
    a telemetry unit disposed on the logging tool body, the telemetry unit cooperating with the processor and configured to telemeter the scaled coefficients to the surface-located telemetry unit, the response function and the telemetered scaled coefficients configured to generate a resulting borehole image at surface to determine a characteristic of the intersected formation feature.

10. The logging tool of claim 9 wherein the logging tool body is configured to be operationally connected to surface equipment by a drill string of the drilling assembly.

11. The apparatus of claim 10 wherein the processor is further programmed to:

measure variation in one or more of the response function coefficients to identify a dipping bed interface intersecting said borehole;

measure a magnitude of one or more of the response function coefficients to compute azimuthal direction of the dipping bed interface.

12. The apparatus of claim 11 wherein the processor is further programmed to:

compute a second derivative of the fitted response function;

determine zero crossings of the second derivative; and determine from the zero crossings azimuthal angles at which a bed boundary interface intersects said borehole.

13. The logging tool of claim 9 wherein the response function is of the form $$f(\phi) = A_5 + A_4 e^{-0.5\left(\frac{|\phi - A_1|}{A_2}\right)^{A_3}}$$

wherein:

$\phi$ is an azimuthal angle;

A1 is a coefficient representing an angle of azimuthal interface with a dipping bed, the angle of azimuthal interface being measured with respect to the borehole's longitudinal axis;

A2 is a coefficient proportional to an azimuthal resolution of the tool;

A3 is a coefficient indicative of a contrast between two beds crossed;

A4 is a coefficient indicative of a difference of tool response amplitude between two formations; and A5 is a coefficient indicative of a tool response amplitude for one of the formations.

14. The logging tool of claim 9, wherein the characteristic of the intersected formation feature comprises a direction of a dipping bed intersected by the borehole.

15. A surface-located well logging apparatus for improving imaging of a formation feature intersected by a borehole in a formation by improving transmission of image data from the borehole to surface, the apparatus comprising:

a telemetry unit configured to receive data telemetered from a logging tool deployed in the borehole, the data representative of a borehole image measured in the borehole with a logging tool sensor of the logging tool while drilling the borehole intersecting the formation feature, the data comprising one or more scaled coefficients of a response function representing measurement physics of the logging tool; and a processor cooperating with the telemetry unit and programmed to combine the received scaled coefficients with the response function to reconstruct reduced borehole data thereby generating a resulting borehole image at surface, the processor determining a characteristic of the intersected formation feature from the resulting borehole image.

16. The surface-located well logging apparatus of claim 15 wherein the response function is of the form $$f(\phi) = A_5 + A_4 e^{-0.5\left(\frac{|\phi - A_1|}{A_2}\right)^{A_3}}$$

wherein:

$\phi$ is an azimuthal angle;

A1 is a coefficient representing an angle of azimuthal interface with a dipping bed, the angle of azimuthal interface being measured with respect to the borehole's longitudinal axis;

A2 is a coefficient proportional to an azimuthal resolution of the tool;

A3 is a coefficient indicative of a contrast between two beds crossed;

A4 is a coefficient indicative of a difference of tool response amplitude between two formations; and A5 is a coefficient indicative of a tool response amplitude for one of the formations.

17. The surface-located well logging apparatus of claim 15 wherein the apparatus is configured to be operationally coupled to the logging tool by a drill string.

18. The surface-located well logging apparatus of claim 15 wherein the processor is further programmed to:

measure variation in one or more of the response function coefficients to identify a dipping bed interface intersecting said borehole;

measure a magnitude of one or more of the response function coefficients to compute azimuthal direction of the dipping bed interface.

19. The apparatus of claim 18 wherein the processor is further programmed to:

compute a second derivative of the fitted response function;

determine zero crossings of the second derivative; and determine from the zero crossings azimuthal angles at which a bed boundary interface intersects said borehole.

20. The apparatus of claim 15, wherein to determine the characteristic of the intersected formation feature, the processor determines a direction of a dipping bed intersected by the borehole.

21. A well logging system for improving imaging of a formation feature intersected by a borehole in the formation by improving transmission of image data from the borehole to surface, the system comprising:

a logging tool disposed on a drilling assembly drilling the borehole intersecting the formation feature, the logging tool comprising:

a logging tool sensor measuring, while drilling the borehole, data representative of a borehole image in the borehole;

a first processor disposed on the logging tool, the first processor operationally connected to the logging tool sensor and programmed to fit the measured data representative of the borehole image to a response function of the logging tool sensor, the response function representing measurement physics of the logging tool, wherein the fitting includes determining one or more response function coefficients, and scale the one or more response function coefficients to a predetermined number of bits; and a first telemetry unit disposed on the logging tool, the first telemetry unit cooperating with the first processor and configured to telemeter the scaled coefficients; and surface equipment disposed at surface and comprising:

a second telemetry unit configured to receive the one or more scaled coefficients from the first telemetry unit; and a second processor cooperating with the second telemetry unit and programmed to combine the received scaled coefficients with the response function to reconstruct reduced borehole data thereby generating a resulting borehole image at surface to determine a characteristic of the intersected formation feature.

22. The well logging system of claim 21 wherein the response function is of the form $$f(\phi) = A_5 + A_4 e^{-0.5\left(\frac{|\phi - A_1|}{A_2}\right)^{A_3}}$$

wherein:
- $\phi$ is an azimuthal angle;
- A1 is a coefficient representing an angle of azimuthal interface with a dipping bed, the angle of azimuthal interface being measured with respect to the borehole's longitudinal axis;
- A2 is a coefficient proportional to an azimuthal resolution of the tool;
- A3 is a coefficient indicative of a contrast between two beds crossed;
- A4 is a coefficient indicative of a difference of tool response amplitude between two formations; and
- A5 is a coefficient indicative of a tool response amplitude for one of the formations.

23. The well logging system of claim 21 wherein the apparatus is configured to be operationally coupled to the logging tool by a drill string.

24. The well logging system of claim 21 wherein at least one of the first and second processors is further programmed to:
- measure variation in one or more of the response function coefficients to identify a dipping bed interface intersecting said borehole;
- measure a magnitude of one or more of the response function coefficients to compute azimuthal direction of the dipping bed interface.

25. The well logging system of claim 21 wherein at least one of the first and second processors is further programmed to:
- compute a second derivative of the fitted response function;
- determine zero crossings of the second derivative; and
- determine from the zero crossings azimuthal angles at which a bed boundary interface intersects said borehole.

26. The system of claim 21, wherein to determine the characteristic of the intersected formation feature, the second processor determines a direction of a dipping bed intersected by the borehole.

* * * * *